United States Patent Office 2,894,813
Patented July 14, 1959

2,894,813

PREPARATION OF WATER-SOLUBLE INORGANIC METAL SALTS AND HCl ACID BY DOUBLE DECOMPOSITION

Abraham Baniel, West Romema, Haifa, and Ruth Blumberg, Mount Carmel, Haifa, Israel, assignors to Makhtsavei Israel, Tel Aviv, Israel, a company of Israel No Drawing. Application April 1, 1957
Serial No. 649,635

Claims priority, application Israel June 26, 1956

4 Claims. (Cl. 23—50)

The invention consists in a process for the preparation of metal salts and acids by the decomposition of another salt of the same metal with a free acid whose anion it is desired to bind to the metal. In the context of the invention the term "metal" includes the ammonium radical. In its most general form, and irrespective of the valences of the metals and acids, the invention relates to equilibrium processes of the kind:

$$MX + HY \rightleftharpoons MY + HX$$

Double-decomposition reactions between metal salts and acids are ordinarily carried out in an aqueous medium. They do not present difficulties where MX, HY and HX are water-soluble but MY is not, as in this case MY precipitates and the equilibrium is shifted to the right side of the equation until the reaction is completed, i.e. until no more M-cation and/or Y-anion is left in the solution.

However, where all the components of the system are water-soluble, the separation of MY is as a rule impractical and may even be impossible.

The invention has the object to provide a process for the preparation of metal salts and acids by a double-decomposition reaction of a free acid with another salt of the same metal, which allows the virtually complete conversion of the metal salt used as starting material into the desired metal salt and the separation of the latter from the liberated acid and any excess of the acid used as a reactant.

The invention is primarily applicable to the preparation of water-soluble salts, though its application to the preparation of sparingly water-soluble or water-insoluble salts is not excluded.

The invention consists in a process for the preparation of metal (including ammonium) salts and acids by the double decomposition of another salt of the same metal with a free acid whose anion it is desired to bind to the metal, wherein the salt serving as starting material is reacted in the solid state with a homogeneous solution consisting of water, the acid used as a reactant and an organic solvent that has limited mutual miscibility with water and in which the salt used as starting material and the salt forming the end product are not appreciably soluble, and the solvent phase containing the acid liberated from the original salt in addition to any residual amount of the acid used as reactant is thereafter separated from the solid reaction product.

When the aqueous-solvent solution of the acid HY is contacted with the solid MX, some solid MY forms and an equivalent amount of HX passes into the solvent. Thereby, an equilibrium is established between HX and HY in the solvent phase and MX and MY in the solid phase.

If the process is performed as a batch process, either complete or partial conversion of MX to MY may be obtained, depending upon the specific case and the reaction conditions employed. If for any reasons the initial reaction is not taken to completion and a mixture of MX and MY is thus obtained, the components of this mixture may in many cases be separated by conventional physical operations. In some cases, the mixtures may be used commercially as they are, e.g. a mixture of KCl and KNO$_3$ may serve as a fertilizer.

Alternatively the salt mixture may be subjected to further reaction with a fresh charge of aqueous-solvent HY solution, and the process may thus be continued until virtually all the MX has been converted into MY.

Or else, the reaction may be carried out in a continuous process, in countercurrent or cascade, by contacting the fresh MX with solvent containing little HY and much HX, while at the other end the fresh aqueous-solvent HY solution is contacted with solid salt containing little MX. In this manner the process yields on the one hand highly concentrated or virtually pure MY, and on the other hand an aqueous-solvent solution of HX containing little or virtually no HY.

Either the HY or the MX may be used in excess, depending on whether the salt or the acid is intended to be obtained in the pure state. In some cases it may also be preferable to use HY and MX in substantially equivalent proportions.

Solvents especially suitable for the purposes of the present invention are monohydric aliphatic alcohols having four or more carbon atoms, or ketones and ethers with upwards of four carbon atoms. Butanols and pentanols or mixtures of any two or more such alcohols which are easily available commercially, may be used with particular advantage. The presence of water in the solvent during the reaction is essential, but its proportion must not be so high that an aqueous phase separates from the solvent phase. Of course, the lower alcohols tolerate more water without separation than do the higher alcohols. Therefore, the choice of the alcohol may in particular cases be influenced, apart from considerations of cost and availability, by the proportion of water which the reaction system must take up, e.g. owing to the concentration of aqueous HY available. The optimal conditions in this respect will have to be determined by experiment for each particular reaction contemplated.

The conversion of MX to MY by the process according to the invention may be carried out at the ambient temperature, and it will in any case have to be performed at temperatures well below the boiling points of the solvents used. Accordingly, smaller corrosion problems will arise although fairly concentrated solutions of acid may be employed.

The concentration of the acid in the aqueous-solvent solution depends on the capacity of the solvent to dissolve the aqueous acid homogeneously. Generally, concentrations of from 1.0 N to 4.0 N, calculated on the total volume of the aqueous-solvent solution, are obtainable without difficulty.

The solvent phase obtained at the end of the reaction contains a mixture of HY and HX, as a rule with HX in considerable excess. It can be worked up in various ways.

One way of recovering the solvent on the one hand and the acids on the other hand consists in separating from the solvent and aqueous acid phase by the addition of a suitable second solvent or solvent mixture whose principal characteristics are that it mixes in all proportions with the first solvent and is by itself not miscible with aqueous acids. Suitable for this purpose are, for example, petroleum hydrocarbons in the naphtha to gas oil range, or aromatic hydrocarbons such as benzene, toluene, xylenes, or the like. The entire water-plus-acid content of the solvent phase then separates as an aqueous phase, which can be drained off. The solvent and aqueous phases can then be worked up separately.

The solvent phase may be subjected, for example, to fractional distillation and the solvents can singly be re-used in the process.

The aqueous acid mixture may be worked up in different ways, depending on its composition. For example, it may be subjected to fractional distillation, which may be done under atmospheric pressure where HY is sulfuric or phosphoric acid, or in vacuo in the case of nitric acid.

Or else, the solvent phase separated from the solids after the reaction may be washed in order preferentially to remove one of the acids. For example, sulfuric acid can be removed from the solvent phase by washing with water, as the coefficient of distribution of this acid between water and the solvent is greatly in favour of water.

Where HY is either nitric or phosphoric acid and HX is hydrochloric acid, the washing with water preferentially removes the hydrochloric acid. On the other hand, nitric acid can be washed out preferentially if a chloride brine is used as washing liquor.

The acid remaining in the solvent phase after the other acid has been washed out, can be separated from the solvent by the admixture of a water-immiscible solvent as described above.

The invention may be used with particular advantage, for example, for the preparation of alkali (including ammonium) nitrates, sulfates or phosphates by the reaction af alkali chloride with free nitric, sulfuric or phosphoric acid. As compared with conventional processes for the conversion of alkali chlorides into sulfates or phosphates by reaction with the corresponding free acids in an aqueous medium (nitrates can not be prepared at all in this way), the invention has the advantage that relatively very small quantities of water have to be handled, and hydrogen chloride is obtained as a by-product in the form of a rather concentrated aqueous liquid which can be used for various commercial purposes without having to be further concentrated. Accordingly, the process according to the invention is characterized by considerable savings of fuel and of reaction space and apparatus.

The invention may also find useful application for the preparation of salts which are either very soluble in water or decompose in an aqueous medium, and which can not therefore be prepared conveniently in an aqueous medium. Examples of such salts are gallium sulfate and mercury sulfate.

The invention has been described above primarily as a process for the preparation of salts. However, it is at the same time a process for the preparation of acids, namely of those acids which are liberated by the double-decomposition reaction from the salts used as starting material. This aspect of the invention prevails in some cases, as the invention gives the possibility of preparing free acids that can not conveniently be prepared by reaction in an aqueous medium. For example, a solvent-solution of chromic acid can be prepared by the reaction of solid sodium chromate with a solvent-solution of sulfuric acid.

The preparation of a free acid by the process according to the invention may also be the first step of a sequence of two operations, in the second of which this free acid serves as one of the starting materials in another double-decomposition reaction. This procedure is important in the case of certain acids that are not available as such but only in solution, e.g. chloric acid.

Such a sequence of two operations has the following scheme:

(1)         MX+HY⇌HX+MY
      Separation of HX from MY
(2)         NY+HX⇌HY+NX

In this scheme, MX is the salt used as starting material, and NX the salt desired as an end product. HY is a suitable acid which can possibly be recycled or is rejected at the end.

An example of such a sequence of operations is the preparation of barium chlorate from readily available sodium chlorate and barium chloride. In an aqueous medium this reaction cannot be performed readily as $BaCl_2$ and $Ba(ClO_3)_2$ have very similar solubilities. In the above scheme, MX would be sodium chlorate, HY—hydrochloric acid, and NY—barium chloride. This gives the following reactions:

$$NaClO_3+HCl\rightleftharpoons HClO_3+NaCl$$
$$\tfrac{1}{2}\,BaCl_2+HClO_3\rightleftharpoons HCl+\tfrac{1}{2}\,Ba(ClO_3)_2$$

The invention is illustrated by the following examples to which it is not limited.

*Example 1*

The reaction liquor (I) is a homogeneous solution composed of 77 mls. of 60%-by-weight aqueous $HNO_3$ and 50 mls. of water made up with isoamyl alcohol to 1000 mls. The acidity of this solution is 1.0 N, calculated on its total volume. This liquor is contacted in countercurrent with 56 g. of finely ground solid KCl. The conditions, in particular the rate of flow of the liquor and the total time of contact, are so chosen that virtually the whole KCl is converted to $KNO_3$ by one single passage of the liquor. The solid end product, therefore, consists of $KNO_3$ of a degree of purity of 98% or even higher.

The runoff solvent phase (II) is a homogeneous aqueous-solvent solution of HCl and $HNO_3$. It may be worked up in several alternative ways, for example as follows:

(a) The solvent phase (II) is mixed with half its volume of benzene. The total water and acid content of the solvent phase (II) is thereby separated as a bottom layer and can be drained off from the solvent mixture (III).

This rather concentrated aqueous acid mixture can be commercially used as such, e.g. as a pickling acid. On the other hand the HCl may be separated from the $HNO_3$ by distillation in vacuo, and the $HNO_3$ can be re-used in the process.

The solvent mixture (III) is separated by fractional distillation into its components, isoamyl alcohol and benzene, both of which are used again in the process.

(b) The solvent phase (II) is extracted with aqueous chloride brine whereby $HNO_3$ is preferentially extracted. The chloride may or may not be the same as that used for the main reaction, e.g. KCl, NaCl, or $NH_4Cl$ may be used. The brine should preferably be saturated. The extraction may be repeated one or several times, or it may be performed as a countercurrent scrubbing process. As a rule it will be sufficient to perform two successive batch extractions, each with an amount of brine corresponding to about one fifth of the volume of the solvent phase. The $HNO_3$ extracted into the brine liberates some HCl which is extracted back into the solvent.

By such a two-stage extraction about 90% of the $NO_3^-$ ion and less than 10% of the $Cl^-$ ion is extracted from the solvent into the brine; by scrubbing, the separation may be made even more complete.

Where $NH_4Cl$ brine is used for the extraction, the free $HNO_3$ washed into the brine may subsequently be neutralized with ammonia, and the brine may then be used in the manufacture of ammonium nitrate.

*Example 2*

The reaction liquor is constituted by a homogeneous solution of 163 g. of 60%-by-weight aqueous sulfuric acid (98 g. of $H_2SO_4$) in a mixture of 446 mls. of isoamyl alcohol and 446 mls. of n-butanol, with an acidity of 2.0 N. This liquor is stirred or shaken with 107 g. of solid $NH_4Cl$ until equilibrium is reached, which takes about 20 minutes. After separation of the solvent phase (II) from the solids, the latter form a mixture of 56% of ammonium sulfate and 44% of ammonium chloride, while the solvent phase contains a homogeneously dissolved mixture of aqueous sulfuric and hydrochloric acids.

The solid mixture is resolved into its components by fractional crystallization from water or by froth flotation.

The solvent phase (II) may again be worked up in several different ways:

(a) The solvent phase is admixed with half its volume of benzene, whereby an aqueous acid mixture is separated as a bottom layer, which is drained off. From this aqueous mixture, HCl can be removed by distillation, or by stripping with a current of warm air, say 80° C,. the residue being in either case concentrated aqueous sulphuric acid which can be re-used in the process.

The alcohol-benzene mixture is separated by fractional distillation and the solvents are separately used again in the process.

(b) The solvent phase (II) is washed with water in batches, or countercurrently in a washing tower, whereby virtually all the sulfuric acid but only a small percentage of HCl is extracted into the water.

From the residual solvent the HCl can be removed by distillation, or again by phase separation through the admixture of a water-immiscible solvent such as benzene.

*Example 3*

The reaction liquor is a homogeneous solution, composed of 77 mls. of 60%-by-weight aqueous $HNO_3$ and 75 mls. of water made up with n-butanol, to 1000 mls., its acidity being 1.0 N.

This solution is contacted in one stage with 87.7 g. of solid NaCl. The solid thereafter separated from the solvent phase amounts to 103.6 g. and contains 49% of $NaNO_3$, which may be separated from the residual NaCl by fractional crystallization from water.

The separated solvent phase contains 25.2 g. of $HNO_3$ and 21.9 g. of HCl and may be worked up in any of the various ways described in Examples 1 and 2.

*Example 4*

6.75 ml. of $H_3PO_4$ (85% w./w.) is diluted with 6 ml. of $H_2O$ and sufficient n-butyl alcohol to give 100 ml. of 1.0 molar $H_3PO_4$ solution. This solution is shaken with 3.7 g. of KCl for 30 minutes and the liquid phase then separated from the solid. By this procedure, about 95% of the KCl is converted to $KH_2PO_4$ in one stage.

The n-butyl alcohol phase containing a mixture of acids, 0.525 molar with respect to $H_3PO_4$ and 0.475 molar with respect to HCl, is mixed with 50 ml. of benzene, which causes the separation of an aqueous phase containing the greater part of both acids. The mixed solvents are washed with two 5 ml. aliquot portions of water and the washings are added to the first aqueous phase. The HCl is separated from the $H_3PO_4$ by distillation; the solvent mixture is subjected to fractional distillation for solvent recovery.

We claim:

1. A process for the prepartion of water-soluble inorganic salts in a biphase solid-liqud reaction system, comprising the reaction by double decomposition of a solid inorganic chloride selected from the group consisting of ammonium chloride and metal chlorides, with an inorganic reactant acid, whose anion it is desired to bind to the cation of said chloride, and simultaneous extraction of acid formed in said reaction, by mixing said chloride which is in the solid state, with a single phase homogeneous solution which does not appreciably dissolve the inorganic chloride and the salt to be formed therefrom, and consists of the solution of an aqueous inorganic reactant acid in a solvent selected from the group consisting of butanols and pentanols and their mixtures, said reaction and simultaneous extraction being carried out at a temperature below the boiling point of said solvent, and separating from the solid phase of the reaction mixture a solvent phase comprising a solution of aqueous HCl in said solvent.

2. A process for the preparation of salts selected from the group consisting of alkali metal and ammonium nitrates, sulfates and phosphates, comprising the reaction by double decomposition of the corresponding solid chloride and simultaneous extraction of acid formed in said reaction, by contacting said chloride in the solid state with a single phase homogeneous solution which does not appreciably dissolve said chloride and the salt to be formed therefrom, and consists of the solution of an aqueous acid selected from the group consisting of nitric, sulfuric and phosphoric acids in a solvent selected from the group consisting of butanols and pentanols and their mixtures, at a temperature below the boiling point of the respective solvents, whereby said chloride is caused to react with said acid and the acid formed is extracted by said solvent, and separating from the solid phase of the reaction mixture a solution of aqueous HCl in said solvent.

3. A process as claimed in claim 1, comprising the steps of admixing said solvent phase separated from the solid phase of the reaction mixture with a solvent which is immiscible with water but homogeneously miscible with solvents of the group consisting of butanols and pentanols and their mixtures, and is selected from the group consisting of petroleum hydrocarbons in the naphtha to gas oil range and aromatic hydrocarbon solvents, whereby an aqueous acid phase is separated from a homogeneous solvent phase, and separating the two phases from each other.

4. A process as claimed in claim 1, comprising the step of subjecting said solvent phase separated from the solid phase of the reaction mixture to a liquid-liquid treatment with an aqeuous fluid selected from the group consisting of water and aqueous chloride brines in order to form two liquid phases, and extract the acid in the aqueous phase.

References Cited in the file of this patent

UNITED STATES PATENTS

| | | |
|---|---|---|
| 1,389,862 | Comment | Sept. 6, 1921 |
| 1,456,850 | Hazen et al. | May 29, 1923 |
| 1,929,442 | Milligan | Oct. 10, 1933 |
| 1,929,443 | Milligan | Oct. 10, 1933 |
| 2,060,715 | Arvin | Nov. 10, 1936 |
| 2,086,084 | Kubelka | July 6, 1937 |
| 2,111,360 | Cutting | Mar. 15, 1938 |

OTHER REFERENCES

Laury: "Hydrocloric Acid and Sodium Sulfate," the Chemical Catalog Co., Inc., N.Y., 1927, page 19.